April 19, 1932. C. KIRCHNER 1,854,516
ANGLE BAR SHEARING AND PUNCHING MECHANISM
Filed June 26, 1930
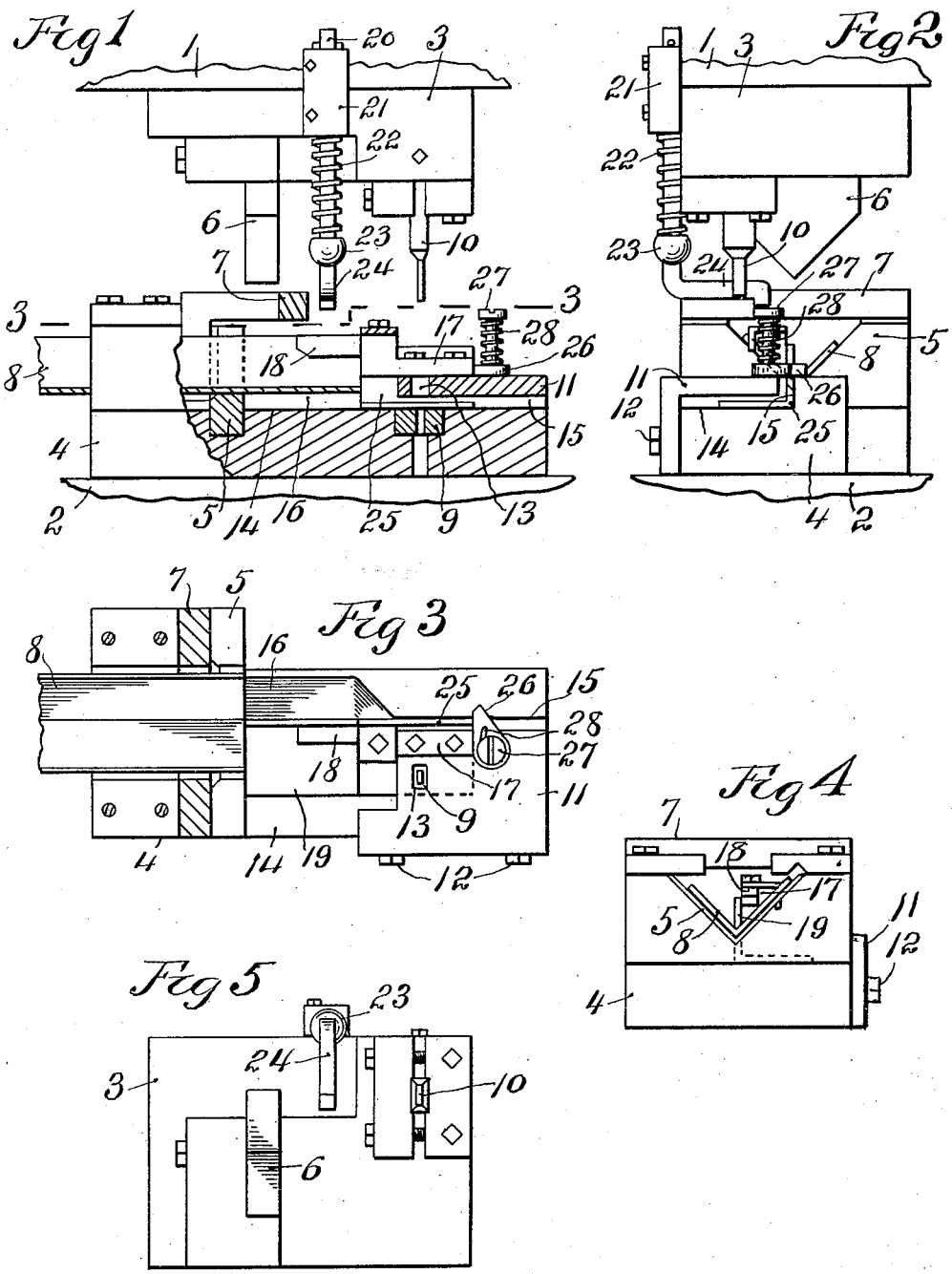
INVENTOR
Carl Kirchner
BY Warren W. House
His ATTORNEY
Witness
H. W. Olson Patented Apr. 19, 1932

1,854,516

UNITED STATES PATENT OFFICE

CARL KIRCHNER, OF CARTHAGE, MISSOURI, ASSIGNOR TO THE LEGGETT AND PLATT SPRING BED AND MANUFACTURING COMPANY, OF CARTHAGE, MISSOURI, A CORPORATION OF MISSOURI

ANGLE BAR SHEARING AND PUNCHING MECHANISM

Application filed June 26, 1930. Serial No. 463,972.

My invention relates to improvements in angle bar shearing and punching mechanisms.

One of the objects of my invention is to provide a novel mechanism for shearing off angle bars and punching a hole through one flange of the sheared off piece. As usually done the angle pieces are sheared from a bar and then, if a hole is desired through one of the flanges, such hole is punched in a separate operation. With my improved mechanism the shearing and punching are carried on in one continuous operation.

A further object of my invention is to provide a novel mechanism of the kind which is simple, cheaply made, strong, durable, not likely to get out of order otherwise than by natural wear, and which is efficient and rapid in its operation.

The novel features of my invention are hereinafter fully described and claimed.

In the accompanying drawings, which illustrate the preferred embodiment of my invention, Fig. 1 is a front view, partly in elevation and partly in vertical section, and partly broken away, of my improved angle bar shearing and punching mechanism.

Fig. 2 is an end elevation of the same.

Fig. 3 is a section on the line 3—3 of Fig. 1.

Fig. 4 is an end elevation of the die support and parts connected therewith.

Fig. 5 is an under view of the punch holder and parts carried thereby.

Similar reference characters designate similar parts in the different views.

1 designates the usual plunger of a punching press, 2 a part of the bed thereof, and 3 a punch holder attached to the plunger 1.

On the bed 2 is mounted in the usual manner a die support 4 having mounted in it the usual V shaped shearing die 5 which cooperates with a V shaped shearing punch 6 mounted in the punch holder 3. 7 is a U shaped stripper fastened to the support 4 and adapted to have the shearing punch 6 pass between its arms.

The upper side of the support 4 has a V shaped groove at the left, as viewed in Fig. 3 for receiving the angle bar 8 which is to be sheared.

To the right of and spaced from the shearing die 5, as viewed in Figs. 1 and 3, there is mounted in the upper side of the support 4, another die 9, which, as shown, may be a perforating die, or other die, suitable for the purpose for which it may be intended.

Fixed in the punch holder 3 is a punch 10 which cooperates with the die 9. 11 is a stripper plate of right angled form fastened to the support 4 by bolts 12 and extending over the die 9, and provided with a hole 13 for receiving the punch 10.

The upper side of the support 4 is provided with longitudinal guiding means leading from the die 5 past the die 9 to the right end of the support, as viewed in Figs. 1 and 3.

Such guiding means comprises a horizontal flat surface 14 which extends rearwardly to a longitudinal wall 15. At the right of the die 5 the top of the support 4, which is at the rear of the flat surface 14, is upwardly and rearwardly inclined, as indicated at 16, Fig. 3.

17 designates a stop gage fastened to the top of the stripper plate 11, for limiting the feed movement of the angle bar 8. Mounted on the gage 17 is a plate 18 which extends in front of the inclined surface 16 and over the flat supporting surface 14.

When the angle bar 8 is fed in the die 5 against the stop gage 17, as shown in Fig. 1, and the plunger and punch holder descend, the punch 6 and die 5 will shear from the angle bar 8 an angle piece 19, which in dropping will strike the inclined surface 16 and will come to rest with one flange resting flatwise on the flat supporting surface 14, and with the other flange disposed against the rear of the plate 18. The last named flange of the angle piece 19 will extend upwardly in the path of the angle bar 8, as shown in Fig. 3.

To insure the angle piece 19 assuming and keeping the position shown in Fig. 3, next to the die 5, there is provided yielding means carried by the punch holder 3, and comprising, as shown a right angled bar, having a vertical arm 20 slidably mounted in a housing 21 attached to the punch holder 3, Fig. 1 and Fig. 2. A coil spring 22 encircles the arm 20 and bears at its upper end against the housing 21, and at its lower end it bears against a shoulder 23 on the arm 20. From the shoulder 23 downwardly and rearwardly extends an arm 24, which, when the punch holder 3 descends, strikes the forward flange of the angle bar 8. When the angle piece 19 has been severed from the bar 8, the arm 24 will rest on the upper side of the flange thereof which is flatwise on the surface 14, thus reliably releasably holding the several angle piece in its proper position on the support 4.

If now the angle bar 8 is fed forward against the stop gage 17, after the punch holder 3 has risen, the angle bar 8 will force forwardly on the surface 14 the severed angle piece 19 to the position indicated by 25 in Figs. 1 and 3, in which position it will be over the die 9.

If the punch holder again descends, the punch 6 and die 5 will shear off another angle piece, and the punch 10 will perforate the angle piece 25 which is over the die 9, the hole being made through the flange of the angle piece which lies flat on the die 9.

To prevent the angle piece 25 from being carried by its momentum past the proper position over the die 9, there is provided a yielding stop gage comprising a plate 26 which extends from the top of the stripper plate 11 over the rear wall 15 of the guiding means and below the upper edge of the vertical flange of the angle piece 25, Figs. 1 and 3. The plate 26 is pivoted on a vertical screw 27 mounted in the stripper plate 11. A coil spring 28 encircles the screw 27 and is fastened at one end to the screw and at its other end it is fastened to the plate 26, the tension of the spring normally forcing the plate 26 to the stop position against the gage 17.

When another angle piece is cut from the bar 8 the angle piece 19 will force the angle piece 25 past the stop plate 26, the angle piece 19 assuming the position which was occupied by the angle piece 25.

Thus with my improved mechanism, an angle bar may be cut into pieces and a flange of each piece perforated in a continuous operation.

I do not limit my invention to the structure shown and described, as many modifications, within the scope of the appended claims, may be made without departing from the spirit of my invention.

What I claim is:

1. In an angle bar shearing and punching mechanism, the combination with the plunger of a punching press, of a die support, a shearing punch and a shearing die respectively carried by said plunger and said support and cooperating with each other to shear off from the forward end of an angle bar, a second punch and die cooperating with each other and respectively carried by said plunger and said support in advance of said shearing punch and die, and means by which the sheared off piece will be held in the path of the angle bar so as to be forced forward thereby on the next forward feeding movement of said bar to a position in which one of its flanges will be disposed flatwise on said second die and in the path of said second punch.

2. In an angle bar shearing and punching mechanism, the combination with the plunger of a punching press, of a die support, a shearing punch and a shearing die respectively carried by said plunger and said support and cooperating with each other to shear off from the forward end of an angle bar, a second punch and die cooperating with each other and respectively carried by said plunger and said support in advance of said shearing punch and die, and means by which on each stroke of the plunger a piece will be sheared from the angle bar and a previously sheared off piece of the angle bar will have one of its flanges operated upon by said second punch and die.

3. In an angle bar shearing and punching mechanism, the combination with the plunger of a punching press, of a die support having guiding means, shearing and perforating means respectively at the rear and in advance of said guiding means and cooperating with said plunger and said support; and means cooperating with said guiding means by which on the forward feeding of an angle bar pieces may be sheared therefrom and one flange of each sheared piece perforated by said shearing and perforating means respectively.

4. In an angle bar shearing and punching mechanism, the combination with a plunger of a punching press, of angle bar shearing and perforating means actuated by said plunger, said perforating means being in advance of said shearing means, and means cooperating with said shearing and perforating means by which a piece sheared from an angle bar by said shearing means and, on the forward feeding of said bar, will be fed forwardly thereby, and, upon the next shearing operation, the sheared off piece will be perforated through one of its flanges by said perforating means.

5. In an angle bar shearing and punching mechanism, the combination with the plunger of a punching press, of a die support having guiding means adapted to support and guide pieces sheared from an angle bar, a shearing punch carried by said plunger, a shearing die carried by said support and cooperating with said punch, a perforating die on said support in the path of travel of said sheared off pieces, and a punch carried by said plunger and cooperating with said perforating die, said guiding means being arranged to guide said pieces successively over said perforating die, each piece with one flange disposed flatwise on said perforating die between the latter and the punch which cooperates therewith, said guiding means supporting said pieces in the path of said angle bar, whereby the latter in being fed forwardly will feed said pieces forwardly.

6. In an angle bar shearing and punching mechanism, the combination with the plunger of a punching press, of a die support having a flat guiding supporting surface, a shearing punch carried by said plunger, a shearing die on said support cooperating with said punch and disposed at one end of said flat supporting surface in a position such that pieces sheared from an angle bar by said punch and die will each be successively on one of its flanges disposed flatwise on said surface and with its other flange in the path of the angle bar as it is fed forwardly, a die having its upper surface flush with said flat supporting surface and in the path of pieces cut from the bar and fed forwardly on said flat supporting surface, and a punch carried by said plunger and cooperating with said last named die.

7. In an angle bar shearing and punching mechanism, the combination with the plunger of a punching press, of a die support having a flat supporting surface, a shearing die and a perforating die, the latter having its upper surface flush with said surface, and the shearing die being so disposed as to permit pieces sheared thereby from an angle bar to fall therefrom with one flange disposed flatwise on said surface, the other flange of each cut off piece being in the path of said angle bar as it is fed forwardly, two punches cooperating with said dies respectively and carried by said plunger, the perforating die being disposed in the path of said flatwise disposed flanges, said support having guiding means for guiding the angle pieces with their flatwise disposed flanges over said perforating die between the latter and its cooperating punch, and yielding means carried by said plunger adapted to successively engage said angle pieces as they are cut off and yieldingly hold them with their flanges flatwise on said flat supporting surface of said support.

8. In an angle bar shearing and punching mechanism, the combination with the plunger of a punching press, of a die support having supporting and guiding means, two dies one a shearing die and the other a perforating die arranged in tandem on said support in positions such that angle pieces sheared by said shearing die from an angle bar will be forced by said angle bar, when it is forwardly fed, on said support to and over said perforating die, two punches respectively cooperating with said dies and carried by said plunger, and yielding means carried by said plunger adapted to successively engage said angle pieces as they are sheared from the bar and yieldingly hold them each with one of its flanges flatwise on said supporting and guiding means and with its other flange in the path of the angle bar, whereby the latter in feeding forwardly pushes said sheared off pieces successively onto said perforating die.

9. In an angle bar shearing and punching mechanism, the combination with a plunger of a punching press, of a die support having longitudinal angle piece guiding means, a shearing die disposed on said support so as to discharge cut off angle pieces into said guiding means, a second die to which said guiding means leads, two punches carried by said plunger and respectively cooperating with said dies, a vertically yielding presser member carried by said plunger between said punches and adapted to successively engage said angle pieces as they are sheared off and hold each with one flange flatwise on said guiding means and with the other flange in the path of feed of the angle bar from which the pieces are sheared by said shearing die and its cooperating punch, and a yielding stop gage on said support arranged to engage and successively hold said cut off angle pieces with one set of their flanges flatwise on said second die in the path of the punch cooperating with said second die.

In testimony whereof I have signed my name to this specification.

CARL KIRCHNER.